United States Patent
Tannenbaum

(10) Patent No.: US 6,233,560 B1
(45) Date of Patent: May 15, 2001

(54) METHOD AND APPARATUS FOR PRESENTING PROXIMAL FEEDBACK IN VOICE COMMAND SYSTEMS

(75) Inventor: Alan Richard Tannenbaum, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/213,857

(22) Filed: Dec. 16, 1998

(51) Int. Cl.[7] ............................... G10L 15/22; G06F 3/16
(52) U.S. Cl. ............................................. 704/275; 345/347
(58) Field of Search ............................. 704/275; 345/347

(56) References Cited

U.S. PATENT DOCUMENTS

| | | |
|---|---|---|
| 4,451,895 * | 5/1984 | Sliwkowski ........................ 345/326 |
| 4,506,142 * | 3/1985 | Takano et al. ..................... 219/490 |
| 4,726,065 | 2/1988 | Froessl . |
| 4,766,529 | 8/1988 | Nakano et al. . |
| 4,783,759 * | 11/1988 | Borgendale et al. ............... 345/347 |
| 5,027,406 | 6/1991 | Roberts et al. . |
| 5,068,900 | 11/1991 | Searcy et al. . |
| 5,133,011 | 7/1992 | McKiel, Jr. . |
| 5,157,384 | 10/1992 | Greanias et al. . |
| 5,222,146 | 6/1993 | Bahl et al. . |
| 5,231,670 | 7/1993 | Goldhor et al. . |
| 5,251,130 * | 10/1993 | Andrews et al. ........................ 704/3 |
| 5,305,244 | 4/1994 | Newman et al. . |
| 5,386,494 | 1/1995 | White . |
| 5,408,582 | 4/1995 | Colier . |
| 5,428,707 | 6/1995 | Gould et al. . |
| 5,452,397 | 9/1995 | Ittycheriah et al. . |
| 5,465,317 | 11/1995 | Epstein . |
| 5,500,920 | 3/1996 | Kupiec . |
| 5,526,407 | 6/1996 | Russell et al. . |
| 5,553,121 | 9/1996 | Martin et al. . |
| 5,602,963 | 2/1997 | Bissonnette et al. . |
| 5,604,840 | 2/1997 | Asai et al. . |
| 5,632,002 | 5/1997 | Hashimoto et al. . |
| 5,638,486 | 6/1997 | Wang et al. . |
| 5,664,061 | 9/1997 | Andreshak et al. . |
| 5,671,328 | 9/1997 | Fitzpatrick et al. . |
| 5,698,834 | 12/1997 | Worthington et al. . |
| 5,706,399 | 1/1998 | Bareis . |
| 5,729,659 | 3/1998 | Potter . |
| 5,864,815 * | 1/1999 | Rozak et al. ......................... 704/275 |
| 6,018,711 * | 1/2000 | French-St. George et al. ..... 704/275 |

* cited by examiner

*Primary Examiner*—Tālivadis I. Šmits
(74) *Attorney, Agent, or Firm*—Robert M. Carwell

(57) ABSTRACT

In a voice actuated computer system voice command from an end user relevant to or promoted from a discrete location on a display screen are analyzed by the system. In response, a confirmation area is displayed on the screen at a location functionally related to the analyzed contents and context of the voice input or the screen location the utterance was prompted from. Within the confirmation area the computer interpretation of the utterance is displayed persisting and dissolving at selectively adjustable rates and times. Display of the recognized utterance is thereby placed in a confirmation area at variable locations where the user's focus is likely to be. Distractions are avoided associated with a fixed location confirmation area which obscures other content on the display screen and/or destroys end-user focus by requiring the eyes to shift from a location of current interest on the display screen to a different location wherein the confirmation is displayed. Persistence and dissolution time of the confirmation area and associated analyzed voice command displayed therein may vary automatically as a function of the degree of confidence of the voice recognition system that the command was accurately analyzed, and correctly recognized commands are automatically executed after display in the confirmation window.

23 Claims, 3 Drawing Sheets

METHOD AND APPARATUS FOR PRESENTING PROXIMAL FEEDBACK IN VOICE COMMAND SYSTEMS

CROSS REFERENCE TO RELATED APPLICATIONS

The present application is related to the following applications: (1) application Ser. No. 09/213,856, filed Dec. 17, 1998, entitled "Speech Command Input Recognition System for Interactive Computer Display With Interpretation of Ancillary Relevant Speech Query, Terms Into Commands" (IBM Docket AT9-98-343); (2) application Ser. No. 09/213,858, filed Dec. 17, 1998, entitled "Speech Command Input Recognition System for Interactive Computer Display With Means for Concurrent and Modeless Distinguishing Between Speech Commands and Speech Queries for Locating Commands" (IBM Docket AT9-98-344); (3) application Ser. No. 09/213,846, filed Dec. 17, 1998, entitled "Speech Command Input Recognition System for Interactive Computer Display with Speech Controlled Display of Recognized Commands", (IBM Docket AT9-98-341); (4) application Ser. No. 09/213,845, filed Dec. 17, 1998, entitled "Speech Command Input Recognition System for Interactive Computer Controller Display with Speech Controller Display of Recognized Commands" (IBM Docket AT9-98-342). All of the above are assigned to a common assignee and filed on the same day as the present patent application.

BACKGROUND OF THE INVENTION

1. Field of the Invention

This invention relates to voice command computer systems and, more particularly, to such systems which present command feedback to the end-user.

2. Background and Related Art

As the computer field has matured, vast improvements have been made in easing the manner in which end-users may interface with the systems. What was originally a crude command line interface requiring keyboard input of the end-user has now evolved to a rich panoply of techniques and devices for facilitating a more natural human interface with the computer. Representative examples of this include various pointing devices such as mice, track balls, touchscreens and voice activated interfaces made possible by advances in computerized speech recognition.

Such speech recognition falls into two major categories. First, systems have been developed for voice data input, examples of which include speech dictation or "speech-to-text" systems such as those marketed by the IBM Corporation and Dragon Systems. Yet a second category of computerized speech recognition technology is represented by command and control systems wherein end-user speech patterns are detected and analyzed. A specific form of this command and control technology is represented by a "desktop navigator", wherein a user may navigate through a computer system's graphical user interface (GUI) by merely speaking menu command words, labels on buttons, directional commands such as "up" and "left" to move the familiar mouse cursor, and the like.

Due to inherent voice recognition errors such speech recognition systems are prone to—partly because of the state of the technology and partly due to the variability of the user's speech patterns and memory of the correct inputs to utter, such systems typically reserve a dedicated, predetermined area of the GUI to display the system's interpretation of the user's utterances. The user, by inspecting this area, is looking for confirmation that the utterance he or she just made was in fact interpreted or acted upon correctly.

Current speech recognition systems display this "best guess" in a control window at a fixed position on the screen of the GUI in a control window. Although the spatial positioning of this control window may in some implementations be altered by the end-user as desired or is placed in a fixed location such as the title bar of the current application being executed, numerous problems nevertheless remain associated with this technology. These methods of displaying these interpreted commands attempt to place the confirmation area in a position so as to not block the visibility of other important portions of the application. However, in doing so, this may necessitate distracting and disrupting eye movement from the area of the screen where the end-user is focusing to the confirmation area of the voice recognition, whereupon the user must then recall and reposition his or her eyes at the area of the screen which had the user's focus prior to the interruption caused by display of the confirmation area. Moreover, current systems display the results of the speech perception system without taking into account interpretation of the command, as it is simply reported.

It will be readily appreciated that in sessions of any length with such a voice recognition computer system these drawbacks can become extremely tiresome both physically and mentally and can severely impact the productivity of the end-user in a manner as to almost effectively negate the aforementioned benefits to voice recognition or navigation systems. Current methods and technology have simply been unable to eliminate these serious problems of maintaining visibility of important areas of the display and the focusing and refocusing just described.

Accordingly, such a voice command and control system was highly desired which could avoid the distractions to end-users and the degradation of visibility of applications presented on GUI user interfaces.

SUMMARY OF THE INVENTION

In a voice actuated computer system, voice input from an end-user, such as command and/or control utterances relevant to or prompted from a discrete location on a display screen, is analyzed by the system. In a response to such analysis, a confirmation area is thereby displayed on the display screen in a location functionally related to the analyzed contents of the voice input or the location the utterance was prompted from. Within the confirmation area the computer system's interpretation of the utterance is displayed for a preselected time and then gradually dissolved also at a preselected rate, such persistence and dissolution being selectively adjustable by the end-user. In this manner, display of the interpretation of the command or control utterance will be placed in a confirmation area which is in turn spatially positioned on the display screen at variable locations functionally related to the content of the command or control utterance so as to be proximal to the location on the display screen which may have had the user's eye focus and which gave rise to the utterance. In this manner, distractions are thereby avoided associated with a fixed location confirmation in the prior art (1) which obscures content of interest on the display screen and/or (2) destroys end-user focus by requiring the eyes to shift from positions of interest on the display screen to a different location wherein the confirmation is displayed. An important factor in the invention is the interpretation of the utterance and therefore the true target of the command. Feedback will be preferably withheld, momentarily in most cases, until such correct interpretation to application functionality can be determined.

In a more general case, the invention is not intended to be limited to the prior art programmer's graphical model comprised of interaction and association with cursor targets, menu items, pointing devices, and toolbars. Rather, the invention contemplates a visual mechanism for display of recognized speech commands in the form of natural language and resulting feedback actions proximal to the area of focus in a graphical user interface which gave rise to and prompted the speech command. Such feedback actions may include text over text, visuals, color change, animation, and gradual reduction of an image or message fading into the target area automatically so as to provide feedback to the end-user that the correct spoken action has been taken in the desired focus or target area.

DETAILED DESCRIPTION

Figure 1:
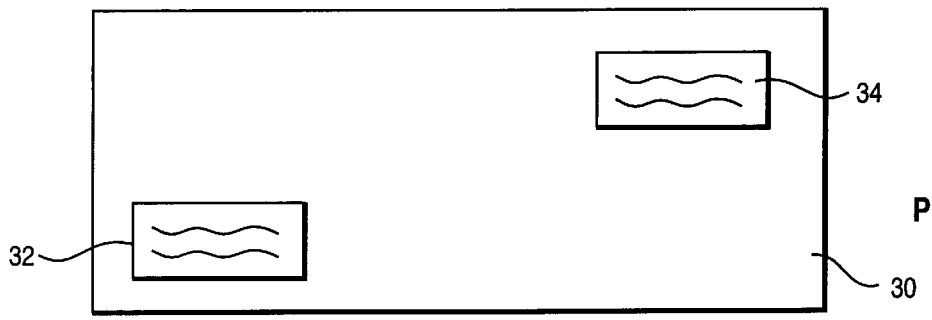
FIG. 1 is a representative display screen in a voice activated computer system demonstrating the method of the prior art for displaying confirmation areas.
Figure 4:
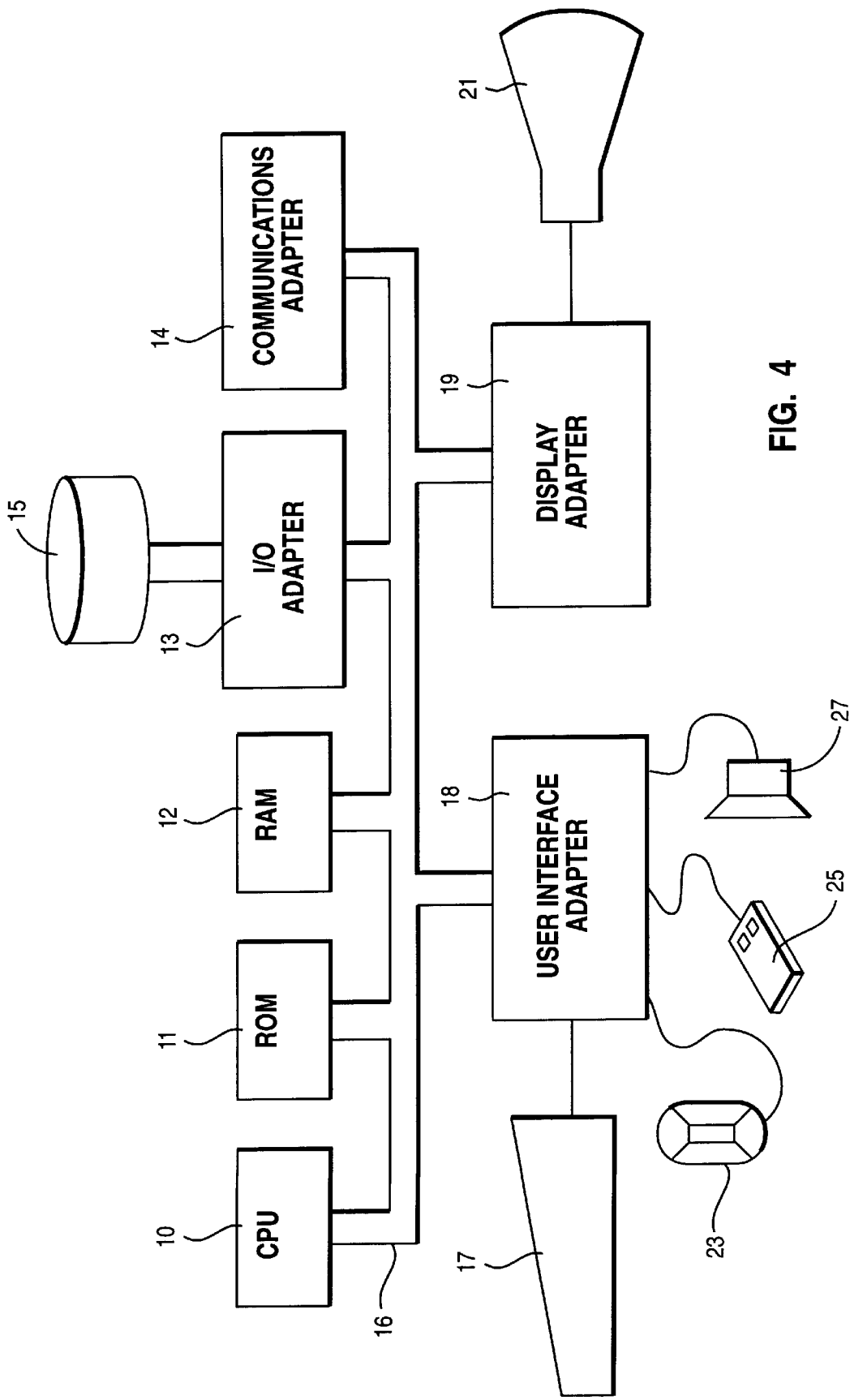
FIG. 4 is a simplified block diagram depicting a voice actuated computer system in which the features of the invention are advantageously implemented.

Turning first to FIG. 1, depicted therein is a simplified illustration of a representative display 30 which might occur on the monitor 39 of the system of FIG. 4 in accordance with the prior art. In this system, a user might be interacting with and accordingly have eyes focused upon an area 32 of the screen 30 which may prompt voice command to be analyzed and acted upon in the system of FIG. 4. Once the voice recognition system makes an attempt to recognize such an utterance, it has been conventional to display the computer's interpretation or translation of this command in a confirmation area 34. For example, if the user is viewing an area 32 of an application in which there is menu of voice activatable choices such as "open dictionary", he or she may consequently utter this command. In response thereto, the computer system, after recognizing the command or its best guess as to an interpretation, this interpretation (such as "open dictionary" if the utterance was correctly so-interpreted) would appear in this confirmation area 34.

A significant deficiency in this operation of voice command systems previously alluded to may be seen clearly depicted with reference to this prior art screen 30 of FIG. 1. It will be noted that whereas the end-user's focus was on area 32, in response to a voice command prompted thereby he or she will receive feedback as to how the command has been interpreted in this confirmation area 34 which is spatially separated a significant distance on the user interface screen from the area 32 which prompted the command in the first place. This causes the user to have to refocus his or her eyes at the diagonally opposite end of the screen 30 at the confirmation area 34 in order to discern whether or not the voice command was correctly interpreted. If so, the user must then cause his or her eyes to traverse back to area 32 and refocus and to regain concentration on the content of this area 32. One reason historically for locating this confirmation area 34 which typically persists for a great deal of time in a fixed and out of the way location on the screen 30 is so that does not thereby obscure other relevant portions of the screen 30 wherein other informational content of the application is to be displayed.

Figure 2A:
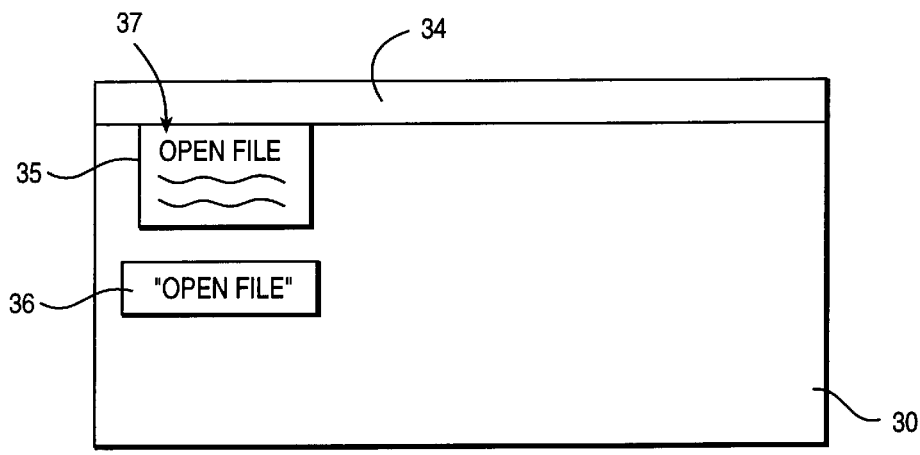
FIGS. 2A and 2B are illustrations of display screens in accordance with the invention for improved displays of confirmation areas associated with voice command and control systems.
Figure 2B:
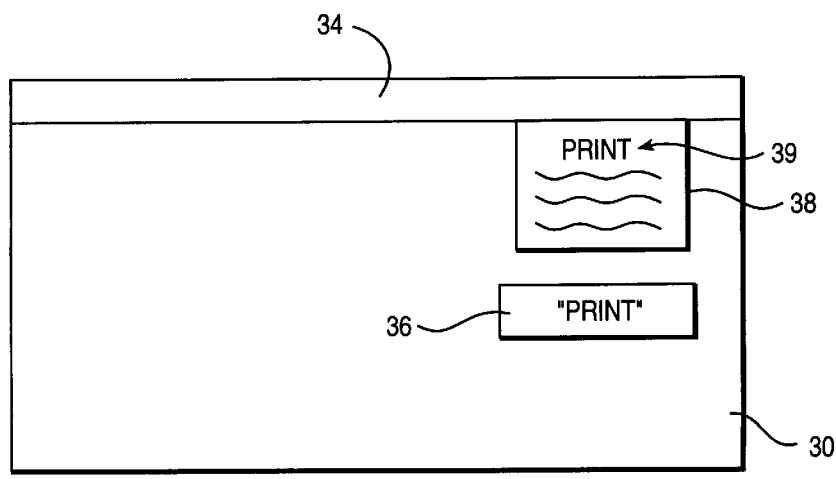

Turning to FIGS. 2A and 2B, displayed therein are correlative examples of screens 30 corresponding to that of the prior art screen 30 of FIG. 1, wherein the features and benefits of the invention may be seen clearly depicted therein. Referring first to FIG. 2A, again a screen 30 on which is displayed a representative screen from a voice actuated application executing in the computer system of FIG. 4 is shown. In this screen 30 it will be noted that a conventional tool bar 34 is shown which may have a pulldown menu 35 associated therewith in the upper left-hand corner of the screen 30. One voice recognizable command shown in this pulldown menu 35 might be "open file" 37. When the end-user utters this "open file" command 37, as in the case of the interface of FIG. 1, the familiar confirmation area 36 may be made to appear proximal to the menu 35 wherein the voice-recognized utterance "open file" will appear (or whatever the system recognizes) thereby providing feedback to the user as to whether the user's speech was correctly recognized.

Similarly, turning to FIG. 2B, yet another pulldown menu 38 may appear associated with the task or tool bar 34 at the upper portion of the screen 30 associated with yet another series of voice recognizable commands. It will be noted that this pulldown menu is at a location on the screen 30 different from that of FIG. 2A, and that this pulldown menu might have a different voice actuatable command such as "print" 39 displayed in this pulldown menu. Upon the user uttering this voice actuatable command "print", in like manner to the case with respect to FIGS. 1 and 2A, in this FIG. 2B will be seen that a confirmation area 36 appears on the display screen 30 proximal to where the voice actuatable "print" 39 command appears.

A comparison of these FIGS. 2A and 2B with the prior art user interface of FIG. 1 reveals an important and significant difference. As previously described, in the case of the prior art FIG. 1 interface, the area of concentration of the end-user 32 may be spatially a significant distance from where the default confirmation area 34 appears, giving rise to the associated undesirable results of disrupting concentration, causing the necessity of eye refocus and the like as the eye traverses between areas 32 and 34.

In contrast, however, it will be noted that in the user interface examples of FIGS. 2A and 2B, a significant difference is that this confirmation area 36 is displayed on the screen 30 in an area proximal to the area on the screen which gave rise to the voice command which in turn caused display of the confirmation area 36 and wherein the user's eyes are thus most likely to be focused. Thus, for example, in FIG. 2A, the confirmation area 36 is proximal, e.g., just below the location on screen 30 where the voice actuatable "open file" command 35 is displayed in the pulldown menu which, when uttered, gave rise to display of this confirmation area 36 on the screen and the recognized "open file".. In like manner, in the illustration of FIG. 2B, this confirmation area 36 now appears at a different location on the screen from that of FIG. 2A, namely at a location proximal to the "print" voice actuatable command 39 associated with pulldown menu 38 which itself appears in a different location from the pulldown menu 35 including the "file" command of FIG. 2A. In this manner, the user's eyes do not have to traverse a disrupting significant distance from the location on the display screen which prompted the voice actuatable command in order to verify that the command was correctly interpreted as viewed in the confirmation area 36.

It is yet a further significant feature of the invention that in the course of the voice navigation program which analyzes and displays the interpreted command in the confirmation area 36 that a context-sensitive analysis function which may include elements of artificial intelligence as desired and appropriate, may be built into the voice recognition system so as to position this confirmation area 36 proximal on the screen 30 to the intended and appropriate target of the command also displayed on the screen 30 which gave rise to display of the confirmation area and the interpreted command displayed therein. Thus, for example, upon the end-user uttering "open file", this subroutine or program feature in the voice recognition program executing on the system of FIG. 4 will determine that because this "open file" command is currently being displayed in the upper left-hand corner of the screen 30 that the confirmation area 36 should therefore appropriately be displayed somewhere proximal to where this "open file" command appears in the drop-down menu 35 of the toolbar 34. Similarly, upon the voice recognition system detecting that the command "print" 39 has been uttered and correlating this to the fact that this command is displayed in the upper right corner of the display 30, the system of the invention will thereby determine that, in contrast to the location of the display of the confirmation area 36 of FIG. 2A, it would now be more appropriate to display this confirmation area 36 in FIG. 2B at a different location on the display screen, e.g., at a location proximal to where this "print" command 39 appeared which gave rise to the "print" utterance from the end-user.

Figure 3:
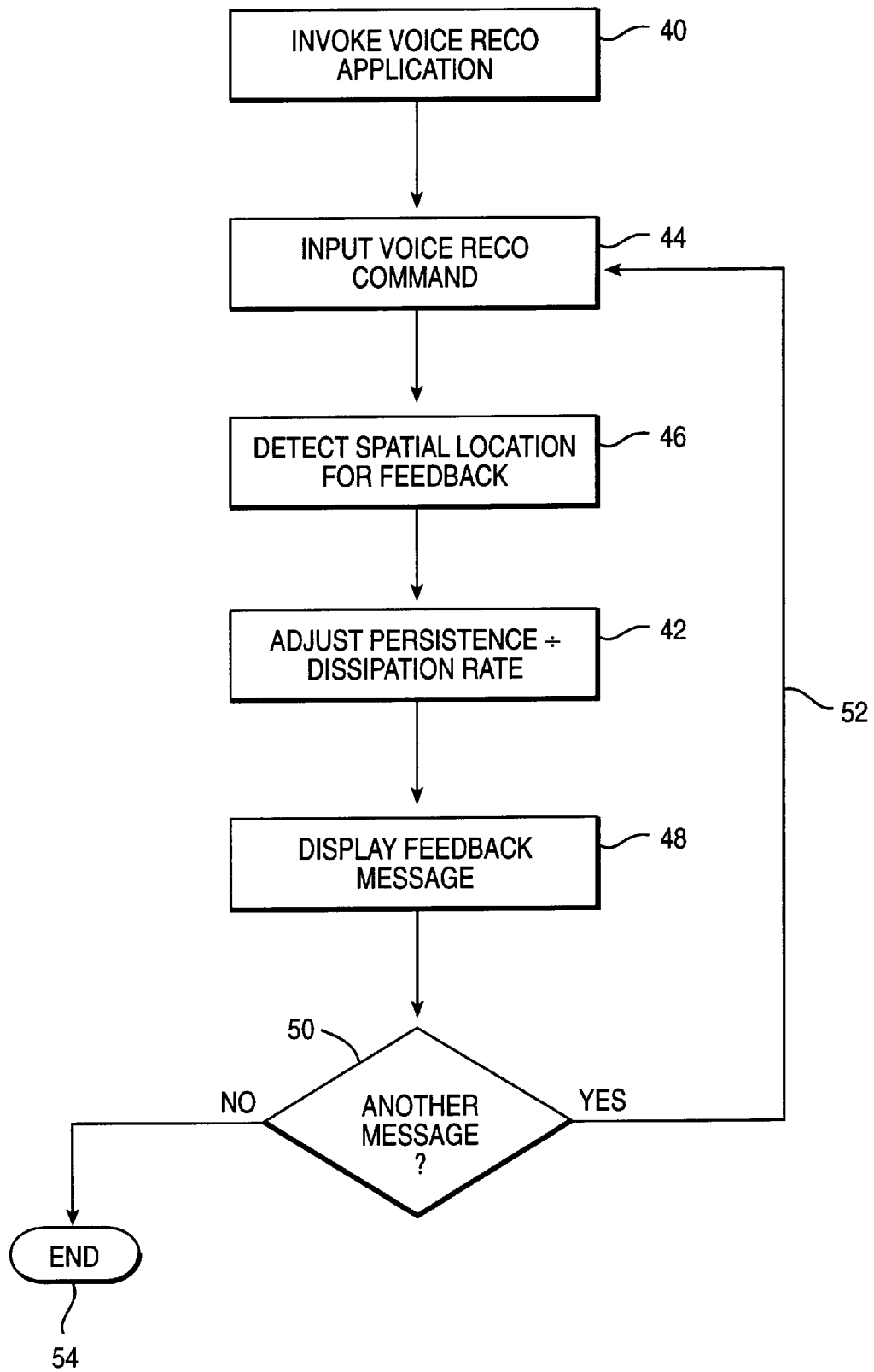
FIG. 3 is a flow diagram implementable in program code executing in the computer system of the invention for effecting the improved confirmation area depicted in FIG. 2.

Turning now to FIG. 3, depicted therein is a flow diagram illustrating how program code would be provided executing on the system of FIG. 4 to implement the aforementioned features of the invention. First, it will be assumed that the end-user has invoked a voice recognition or navigation application, as shown at box 40 which will be executing on the system of FIG. 4. It may be desirable to the end-user to adjust the persistence and dissipation of the confirmation area 36 prior to continuing with the process of FIG. 3. Accordingly, as shown by the dotted lines and the box 42, this program code may be adapted to accommodate this feature. Alternatively, it will be appreciated that a feature of the invention may be to selectively alter this persistence and dissipation automatically, for example, as a function of the degree of confidence with which the voice recognition system has recognized the utterance of the end-user. If, for example, the voice recognition system has almost a 100% confidence factor that the words "close application" have been recognized, the persistence time and dissipation time of the confirmation message would desirably be lessened substantially in that it is less likely that this feedback would be of significance to the end-user. On the other hand, if the voice recognition application had difficulty in recognizing an utterance, it would be desirable to automatically lengthen the persistence and dissipation time of the confirmation message. This will allow the end-user more time to notice that the command has not been interpreted correctly and to take corrective actions such as manually entering the correct desired command in the confirmation area or by manually effecting the command through use of the keyboard or pointing device, or by invoking an undo feature.

Continuing with FIG. 3, once the voice recognition application program has been invoked and is executing, it will be assumed that the end-user will input a voice recognition command shown at box 44 in response to viewing a correlative command displayed on the display 30. Such input may be made by means of a microphone 28 shown in the system of FIG. 4 and in response to reviewing one or more display screens 30 occurring on the monitor 39 of FIG. 4.

Once this voice recognition command has been uttered, the system of FIG. 4 will thereafter detect an appropriate spatial location for providing feedback to the end-user in a confirmation area 36, this step being illustrated by block 46 of FIG. 3. It will be recalled that this implementation of this functional block may include, as previously described, various factors as appropriate—including elements of artificial intelligence which have been sensing prior user interaction with the application. Additionally, such detection at block 46 may further include analysis of which voice actuatable commands are currently being displayed on the display screen 30, and may also incorporate intelligent predictions as to where the end-user's eye and intellectual focus may next occur on the display screen 30 based upon analysis of prior interaction with the voice actuatable program.

Continuing with FIG. 3, once the program code has detected the desirable spatial location for feedback in the confirmation area 36, the system will thereafter cause display of an appropriate feedback message 48 in a confirmation area 36 located on the screen 30 (FIGS. 2A–2B) based upon the analysis which previously transpired with reference to the function of box 46. It will be noted that one appropriate such feedback message might be simply displaying the alpha numeric version of the uttered command or instruction from the end-user as interpreted by the voice recognition program, e.g., displaying the words "open file" in the confirmation area 36 upon detecting that it appears the end-user has uttered the words "open file" in response to viewing this as a voice actuatable command choice in the pop-up menu 35.

Once this "best guess" interpretation of the uttered voice command has thereby been displayed, 48, the process of FIG. 3 thereafter queries whether another message or command has been uttered by the end-user, shown by the decision block 50 of FIG. 3. If another message has been detected, flow exits to the left of block 50 and is routed along path 52 back to block 44 wherein this next voice command utterance input will be analyzed. Flow then continues vertically downward along the flow diagram of FIG. 3, whereupon this next desired spatial location for the confirmation area 36 for this next utterance is detected and the particular command analyzed. If, on the other hand, in response to the query at decision block 50, it has been determined that another voice command has not been entered or will not be entered (for example, because the voice navigable application has been closed), the process exits to the right of decision block 50 and the process ends, 54.

Before describing a block diagram of a computer system in which the invention may be advantageously employed, a few additional points must be noted. It should be readily apparent from the foregoing that once the confirmation area 36 has been extinguished after an appropriate length of persistence and dissipation, if the command has been correctly recognized it will automatically be executed by the system. If, on the other hand, it has not been correctly recognized, while the confirmation area still persists and before it has dissipated, the end-user may (depending upon a user-determined preference) override the recognized command (or cause execution of a correct command in the event the command has not been recognized) by means of manual entry in the keyboard, or use of a pointing device as required, or the utterance of a special voice command such as "STOP".

Yet an additional point is that although in the foregoing illustrations, voice recognition has been employed with respect to predetermined command choices for the end-user to select from a displayed pulldown menu or the like, the invention is not intended to be so limited. Accordingly, there may be voice actuatable actions not associated with messages appearing on the screen. Representative examples of this might be directional controls such as "move cursor down" or "enlarge figure". Such uttered directions may also, in like manner to a menu of command choices displayed on the screen, be recognizable by the voice system and acted upon, also with a confirmation of the words uttered appearing in a confirmation area 36 prior to execution of the recognized command or correction thereof to the keyboard or pointing device. Also, in keeping with a fundamental concept of the invention, even in such cases wherein a menu of spoken commands to select from is not present, it is contemplated that the voice recognition system will be command-context sensitive in the sense that it may intelligently determine where to place the confirmation area 36 dependent upon the words uttered by the end-user. For example, if the end-user had uttered "move cursor to the right two inches", the system could determine by recognizing the word "cursor" that some action associated with the cursor was desired—such as a move, shape change, or the like. Accordingly, the system would automatically display the confirmation area 36 with the recognized command displayed proximal to the current location of the cursor on the display screen 30. This, of course, is in recognition of the likelihood that the end-user will have focused his or her eyes immediately preceding the command on the cursor and thereby may be expecting a confirmation message to appear somewhere proximal to the current cursor location.

FIG. 4 illustrates a preferred embodiment of a computer system which may advantageously employ the improved pointing device resolution system of the present invention. The system comprises a CPU 10, read only memory (ROM) 11, random access memory (RAM) 12, I/O adapter 13, user interface adapter 18, communications adapter 14, and display adapter 19, all interconnected via a common address/data and control path or bus 16. Each of the above components accesses the common bus utilizing conventional techniques known to those of ordinary skill in the art, and includes such methods as dedicating particular address ranges to each component in the system, with the CPU being the busmaster. As is further shown in FIG. 4, these external devices such as DASD 15 interface to a common bus 16 through respective adapters such as I/O adapter 13. Other external devices, such as the display 21, similarly use their respective adapter such as display adapter 19 to provide data flow between the bus 16 and the display 21 or other device. Various user interface means are provided for interconnection and use with the user interface adapter 18, which, in the figure has attached thereto representative user input devices such as joy stick 23, mouse 25, keyboard 17, and speaker and/or microphone 27. Each of these units is well known in as such and accordingly will not be described herein.

The invention admits to implementation on essentially any computer system and corresponding microprocessor, such as the RS/6000™, RISC-based workstations and personal computers of the IBM Corporation executing the AIX™ and OS/2™ operating systems, respectively, or similar machines of other vendors, which include for example in the case of an RS/6000 workstation a 604 PowerPC™ RISC chip. (RS/6000, IBM, AIX, OS/2 and PowerPC are trademarks of the IBM Corporation).

Contained with the CPU 10 of FIG. 4, typically is one or more microprocessors which performs the system address, data, and control processing functions necessary for correct operation of the system of FIG. 4. Although the invention admits to application to various microprocessor designs, in the embodiment disclosed herein, the microprocessor takes the form of a PowerPC 604 microprocessor manufactured by the IBM Corporation, which is a species of microprocessor known as a reduced instruction set computer (RISC) microprocessor. Further details regarding the architecture and operation of such a microprocessor may be obtained from the PowerPC 604 RISC Microprocessor Users Manual, Document #MPC604UM/AD, November, 1994, copyright IBM Corporation, which is incorporated herein by reference.

In the context of the invention, the user will view various objects such as a cursor and pop up or pop down menus on the display 21 which may be manipulated by means of various pointing devices such as the mouse 25 and voice activated navigation. Program code associated with the user interface adapter 18 by way of a device driver for the pointing device 25 and microphone 27 in conjunction with operating environment and application code resident in RAM 12 and/or DASD 15 will facilitate and enable movement of a cursor on the display screen 21 responsive to and in association with correlative voice commands spoken into microphone 27.

It will be understood from the foregoing description that various modifications and changes may be made in the preferred embodiment of the present invention without departing from its true spirit. It is intended that this description is for purposes of illustration only and should not be construed in a limiting sense. The scope of this invention should be limited only by the language of the following claims.

What is claimed is:

1. A method for presenting feedback on a display in a voice command recognition computer system executing a voice recognition application, comprising:

recognizing a speech command;

selecting one of a plurality of positions on said display as a function of said recognized speech command;

displaying feedback at a confirmation area proximal to said one of said positions and corresponding to said command;

extinguishing said feedback at a time after said displaying;

automatically executing said command after said displaying; and wherein timing of said extinguishing is dynamically selected and wherein said feedback is selected from a group comprising a color change, animation, message, or reducing image on said display.

2. The method of claim 1 further including determining a confidence factor corresponding to accuracy of said recognizing; and wherein said time of extinguishing corresponds to said confidence factor.

3. The method of claim 2 including depicting on said display information corresponding to said speech command at a location on said display;

wherein said speech command corresponds to said information; and wherein said one of said positions corresponds to said location.

4. The method of claim 2 including analyzing said speech command; and wherein said one of said positions is a function of said analyzing.

5. The method of claim 2 wherein said computer system includes
   a graphical user interface on said display and a pointing device; and
   wherein said speech command corresponds to a command displayed on said graphical user interface actuatable by said pointing device.

6. The method of claim 2 wherein said confidence factor and said timing of extinguishing are inversely related.

7. The method of claim 1 further including
   recognizing a next speech command;
   selecting a next one of a plurality of positions on said display screen as a function of said recognized next speech command; and
   displaying next feedback at a next confirmation area proximal to said next one of said positions and corresponding to said next speech command.

8. An apparatus for presenting feedback on a display in a voice command recognition computer system executing a voice recognition application, comprising:
   means for recognizing a speech command;
   means for selecting one of a plurality of positions on said display as a function of said recognized speech command;
   means for displaying feedback at a confirmation area proximal to said one of said positions and corresponding to said command;
   means for extinguishing said feedback at a time after said displaying; means for automatically executing said command after said displaying; and
   wherein said timing of said extinguishing is dynamically selected and wherein said feedback is selected from a group comprising a color change, animation, message, or reducing image on said display.

9. The apparatus of claim 8 further including
   means for determining a confidence factor corresponding to accuracy of said detecting; and
   wherein said time of extinguishing corresponds to said confidence factor.

10. The apparatus of claim 9 including
    means for depicting on said display information corresponding to said speech command at a location on said display;
    wherein said speech command corresponds to said information; and
    wherein said one of said positions corresponds to said location.

11. The apparatus of claim 9 including
    means for analyzing said speech command; and
    wherein said one of said positions is a function of said analyzing.

12. The apparatus of claim 9 wherein said computer system includes
    a graphical user interface on said display and a pointing device; and
    wherein said speech command corresponds to a command displayed on said graphical user interface actuatable by said pointing device.

13. The apparatus of claim 9 wherein said computer system includes
    a graphical user interface on said display and a pointing device; and
    wherein said speech command corresponds to a non-visible command interpreted by an application running on said graphical environment.

14. The apparatus of claim 9 wherein said confidence factor and said timing of extinguishing are inversely related; and wherein said computer system further includes
    a graphical user interface on said display and a pointing device; and
    wherein said speech command corresponds to a non-visible command interpreted by an application executing in said graphical user interface.

15. The apparatus of claim 8 further including
    means for recognizing a next speech command;
    means for selecting a next one of a plurality of positions on said display screen as a function of said recognized next speech command; and
    means for displaying next feedback at a next confirmation area proximal to said next one of said positions and corresponding to said next speech command.

16. A program product for presenting feedback on a display in a voice command recognition computer system executing a voice recognition application, comprising:
    program code means for recognizing a speech command;
    program code means for selecting one of a plurality of positions on said display as a function of said recognized speech command; and
    program code means for displaying feedback at a confirmation area proximal to said one of said positions and corresponding to said command;
    program code means for extinguishing said feedback at a time after said displaying;
    program code means for automatically executing said command after said displaying; and
    wherein said timing of said extinguishing is dynamically selected and wherein said feedback is selected from a group comprising a color change, animation, message, or reducing image on said display.

17. The program product of claim 16 further including
    program code means for determining a confidence factor corresponding to accuracy of said recognizing a speech command; and
    wherein said timing of extinguishing corresponds to said confidence factor.

18. The program product of claim 17 including
    program code means for depicting on said display information corresponding to said speech command at a location on said display;
    wherein said speech command corresponds to said information; and
    wherein said one of said positions corresponds to said location.

19. The program product of claim 17 including
    program code means for analyzing said speech command; and
    wherein said one of said positions is a function of said analyzing.

20. The program product of claim 17 wherein said computer system includes
    a graphical user interface on said display and a pointing device; and
    wherein said speech command corresponds to a command displayed on said graphical user interface actuatable by said pointing device.

21. The program product of claim 17 wherein said computer system includes
    a graphical user interface on said display and a pointing device; and wherein said speech command corresponds to a nonvisible command interpreted by an application running on said graphical environment.

22. The program product of claim 17 wherein said confidence factor and said timing of extinguishing are inversely related.

23. The program product of claim 16 further including program code means for recognizing a next speech command;

program code means for selecting a next one of a plurality of positions on said display screen as a function of said recognized next speech command; and program code means for displaying next feedback at a next confirmation area proximal to said next one of said positions and corresponding to said next speech command.

* * * * *